US008084951B2

(12) United States Patent
Park et al.

(10) Patent No.: US 8,084,951 B2

(45) Date of Patent: Dec. 27, 2011

(54) INVERTER AND LIQUID CRYSTAL DISPLAY DEVICE INCLUDING THE SAME

(75) Inventors: Hyun-Il Park, Gyeonggi-Do (KR); Min-Woo Kim, Yongin-si (KR); On-Sik Choi, Seongnam-si (KR); Sung-Kyu Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 603 days.

(21) Appl. No.: 12/196,967

(22) Filed: Aug. 22, 2008

(65) Prior Publication Data

US 2009/0096383 A1 Apr. 16, 2009

(30) Foreign Application Priority Data

Oct. 10, 2007 (KR) ........................ 10-2007-0101952

(51) Int. Cl.
*H05B 37/02* (2006.01)

(52) U.S. Cl. ................ 315/209 R; 315/232; 315/241 R; 315/276; 315/360; 315/307; 345/102; 345/104; 345/87

(58) Field of Classification Search .............. 315/209 R, 315/291, 276, 360, 307, DIG. 5, DIG. 7, 315/239, 232, 241 R, 169.4; 361/15, 17, 361/301.2, 328; 363/97, 98, 131; 345/102, 345/104, 87, 55; 349/61
See application file for complete search history.

(56) References Cited

U.S. PATENT DOCUMENTS

| | | | | |
|---|---|---|---|---|
| 4,912,374 | A * | 3/1990 | Nagase et al. | 315/244 |
| 5,949,197 | A * | 9/1999 | Kastner | 315/291 |
| 6,661,181 | B2 * | 12/2003 | Shin | 315/169.4 |
| 7,248,459 | B2 * | 7/2007 | Azodi | 361/328 |
| 7,405,497 | B2 * | 7/2008 | Jacobs et al. | 307/82 |
| 2006/0203525 | A1 * | 9/2006 | Yu et al. | 363/97 |

* cited by examiner

*Primary Examiner* — Haiss Philogene

(74) *Attorney, Agent, or Firm* — Innovation Counsel LLP

(57) ABSTRACT

Disclosed is a liquid crystal display panel which includes a switching circuit for converting an input voltage into an alternating current (AC) voltage, a transformer for boosting the AC voltage generated from the switching circuit, and a bypass capacitor part connected in parallel between an output terminal of the switching circuit and the transformer.

10 Claims, 10 Drawing Sheets

INVERTER AND LIQUID CRYSTAL DISPLAY DEVICE INCLUDING THE SAME

CROSS-REFERENCE TO RELATED APPLICATION

This application claims priority under 35 U.S.C. §119 to Korean Patent Application No. 10-2007-0101952, filed on Oct. 10, 2007 in the Korean Intellectual Property Office (KIPO), the contents of which are incorporated herein by reference in their entirety.

BACKGROUND

This disclosure relates to an inverter and a liquid crystal display ("LCD") device including the same, and more particularly, to an inverter that protects a switching circuit and prevents an influence caused by a broadband noise and an LCD device including the same.

With the development of the modern information age, an application range of LCD devices has been greatly extended. Although LCD devices are typically more expensive than cathode ray tube ("CRT") display devices, they have received increased attention for use as alternatives of the CRT display devices due to their recognized advantages of being light in weight, slim in size, and low in power consumption.

An LCD device includes an LCD panel for displaying images in response to an image signal, a panel driver for driving the LCD panel, a lamp for providing light to the LCD panel, and an inverter for supplying a power source to the lamp.

The inverter supplies tube current to the lamp. The inverter converts an input direct current ("DC") voltage into an alternating current ("AC") voltage and boosts the converted AC voltage. While the inverter converts a DC voltage into an AC voltage or boosts the AC voltage, a broadband noise is generated.

The broadband noise may affect the picture quality of the LCD panel and may be harmful to human body. A metal shield case has been used to shield the broadband noise generated from the inverter. The shield case may reduce an influence caused by the broadband noise but increase costs. Furthermore, the thickness and weight of the LCD device is increased due to the shield case.

BRIEF SUMMARY

In accordance with the exemplary embodiments disclosed herein, an inverter and an LCD device including the same will protect internal circuits by means of a bypass capacitor part for stabilizing a voltage supplied to a primary side of a transformer and will prevent a broadband noise.

In one exemplary embodiment, an inverter includes a switching circuit for converting an input voltage into an alternating current ("AC") voltage, a transformer for boosting the AC voltage generated from the switching circuit, and a bypass capacitor part connected in parallel between an output terminal of the switching circuit and the transformer.

The bypass capacitor may include a plurality of capacitors connected in parallel to each other.

The inverter may further include a power supply for supplying the input voltage to the switching circuit, and a control signal generator for supplying a logic signal to the switching circuit.

The transformer may include a primary coil to which the AC voltage generated from the switching circuit is applied, a secondary coil connected to at least one lamp.

The secondary coil may be plural in number.

The inverter may further include a second bypass capacitor part connected in parallel between the power supply and the switching circuit.

In another exemplary embodiment, a liquid crystal display device includes a liquid crystal display panel, a lamp for supplying light to the liquid crystal display panel, and an inverter for driving the lamp, wherein the inverter includes a switching circuit for converting an input voltage into an alternating current ("AC") voltage, a transformer for boosting the AC voltage generated from the switching circuit, and a bypass capacitor part connected in parallel between an output terminal of the switching circuit and the transformer.

The liquid crystal display device may further include a gate driver and a data driver for driving the liquid crystal display panel, a timing controller for supplying a control signal and a data signal to the gate driver and the data driver, a power supply for supplying a driving voltage to the gate driver and the data driver and supplying an input voltage to the inverter, and a control signal generator for supplying a logic signal to the inverter.

The transformer may include a primary coil to which the AC voltage generated from the switching circuit is applied, and a secondary coil connected to the lamp.

The secondary coil may be plural in number.

The liquid crystal display device may further include a second bypass capacitor part connected in parallel between the power supply and the switching circuit.

The bypass capacitor part may include a plurality of capacitors connected in parallel to each other.

A better understanding of the above and many other features and advantages of this invention may be obtained from a consideration of the detailed description thereof below, particularly if such consideration is made in conjunction with the several views of the appended drawings, wherein like elements are referred to by like reference numerals throughout.

DETAILED DESCRIPTION

Figure 1:
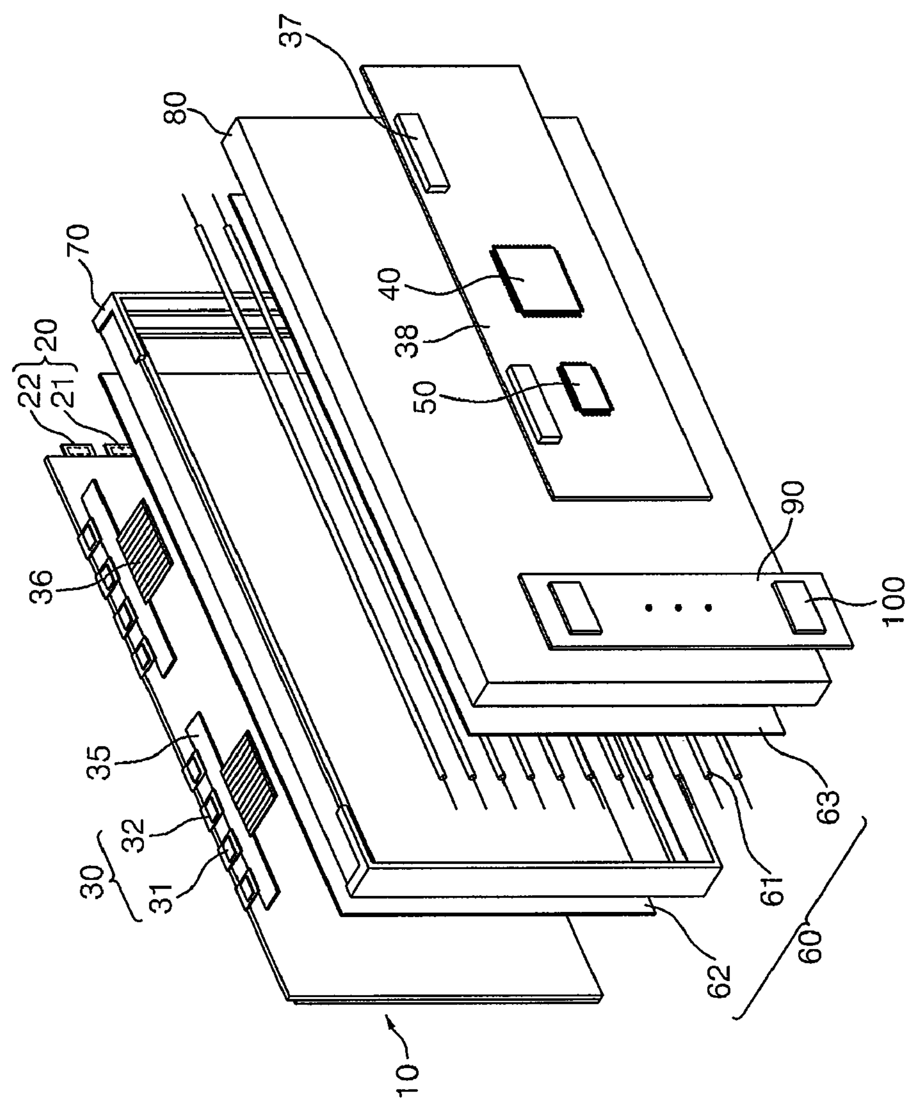
FIG. 1 is an exploded perspective view of an LCD device according to an exemplary embodiment of the present invention.

FIG. 1 is an exploded perspective view of an LCD device according to an exemplary embodiment of the present invention.

Referring to FIG. 1, an LCD device includes an LCD panel 10, a gate driver 20, a data driver 30, a power supply 50, a timing controller 40, a backlight unit 60, an inverter 100, and a bottom chassis 80.

The LCD panel 10 is formed such that a thin film transistor ("TFT") substrate and a color filter substrate are assembled with liquid crystal molecules disposed therebetween. The LCD panel 10 includes a plurality of gate lines and a plurality of data lines that cross each other. A TFT and a pixel electrode are formed in each area where the gate lines intersect the data lines. The LCD panel 10 displays images according to a gate-on voltage supplied through the gate lines and a data voltage supplied through the data lines.

The gate driver 20 may be formed in a structure in which a gate integrated circuit ("IC") 21 is mounted onto a gate tape carrier package 22. The gate driver 20 may be attached to one side of the LCD panel 10. The gate driver 20 sequentially drives the gate lines of the LCD panel 10 by using gate-on and gate-off voltages supplied from the power supply 20 and the timing controller 40 and using a gate control circuit.

The data driver 30 may be formed in a structure in which a data IC 31 is mounted onto a data tape carrier package 32. One side of the data driver 30 is attached to the LCD panel 10 and the other side thereof is attached to a data printed circuit board ("PCB") 35. The data driver 30 supplies a data voltage to the data lines of the LCD panel 10 according to an analog voltage, a data control signal, and a data signal provided by the power supply 50.

One side of the data PCB 35 is connected to the data driver 30 and the other side thereof is connected to a control PCB 38 through a signal transmission film 36. The signal transmission film 36 may be attached to the back side of the data PCB 35 and is inserted into a connector 37 installed on the control PCB 38.

The signal transmission film 36 may use a flexible PCB on which a signal transmission line and a connection pad formed of a thin metal film on a base film, and a protective film are sequentially deposited.

The power supply 50 and the timing controller 40 are mounted onto the control PCB 38.

The gate driver 20 and the data driver 30 may be integrated into the LCD panel 10 in the shape of amorphous silicon gate.

The power supply 50 generates driving voltages, such as a gate-on voltage, a gate-off voltage, an analog driving voltage, and an input voltage, from an externally applied voltage. The gate-on and gate-off voltages are supplied to the gate driver 20 and the analog driving voltage is supplied to the data driver 30. The input voltage is supplied to the inverter 100. The input voltage may be a DC voltage of about 20V to about 30V.

The timing controller 40 supplies an externally input data signal to the data driver 30. The timing controller 40 generates a gate control signal and a data control signal. The gate control signal is supplied to the gate driver 20 and the data control signal is supplied to the data driver 30.

The control PCB 38 supplies pixel data and an analog voltage applied from an external unit through the signal transmission film 36 to the data PCB 35. The control PCB 38 also supplies the gate control signal and the gate-on and gate-off voltages to the gate driver 20 connected to the LCD panel 10.

The timing controller 40 and the power supply 50 may be mounted onto the data PCB 35.

The bottom chassis 80 receives and fixes the LCD panel 10 and the backlight unit 60. The control PCB 38 and an inverter PCB 90 are attached to the back side of the bottom chassis 80. The bottom chassis 80 may use a metal of high intensity to protect the LCD panel 10 and the backlight unit 60.

The backlight unit 60 includes at least one lamp 61, an optical sheet 62, and a reflective sheet 63.

The lamp 61 may use a cold cathode fluorescent lamp, an external electrode lamp, etc. A plurality of lamps 61 may be arranged at the back side of the LCD panel 10 to supply light to the LCD panel 10.

Like an edge-type backlight unit, the lamp 61 may be formed at the lateral side of the LCD panel 10 to supply light to the LCD panel 10 through a light guide plate (not shown).

The optical sheet 62 is formed of a flat type between the LCD panel 10 and the lamp 61 to improve the efficiency and uniformity of light supplied from the lamp 61. The optical sheet 62 may include a diffusion sheet, a prism sheet, and a protective sheet.

The reflective sheet 63 is formed between the lamp 61 and the bottom chassis 80 to reflect light emitted toward the bottom chassis 80 in the direction of the LCD panel 10.

The LCD device may further include a mold frame 70 for fixing the LCD panel 10. The optical sheet 62 may be mounted and fixed at the mold frame 70. The mold frame 70 at which the LCD panel 10 and the optical sheet 62 are mounted and fixed is received in the bottom chassis 80.

The inverter 100 is mounted onto the inverter PCB 90. The inverter PCB 90 onto which the inverter 100 is mounted is fixed to the back side of the bottom chassis 80.

The inverter 100 converts an input DC voltage into an AC voltage and boosts the converted AC voltage to generate a lamp voltage.

Figure 2:
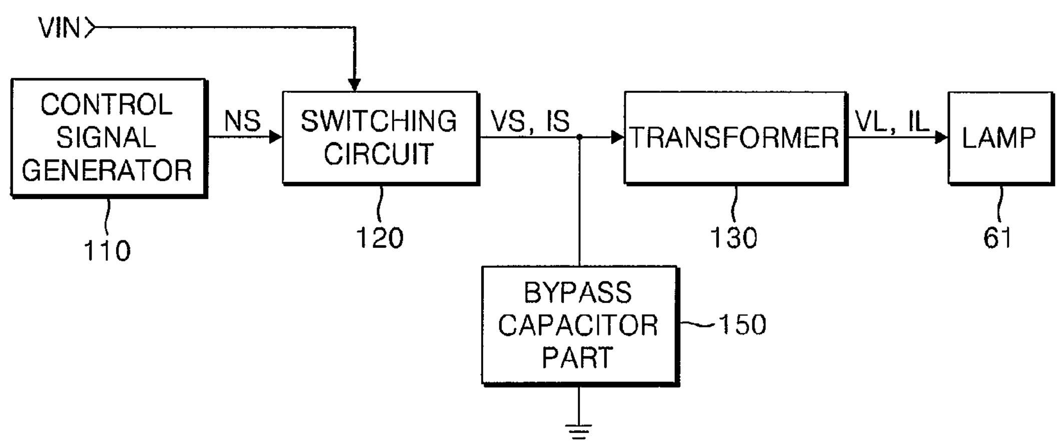
FIG. 2 is a block diagram of the inverter shown in FIG. 1 according to a first exemplary embodiment of the present invention.
Figure 3:
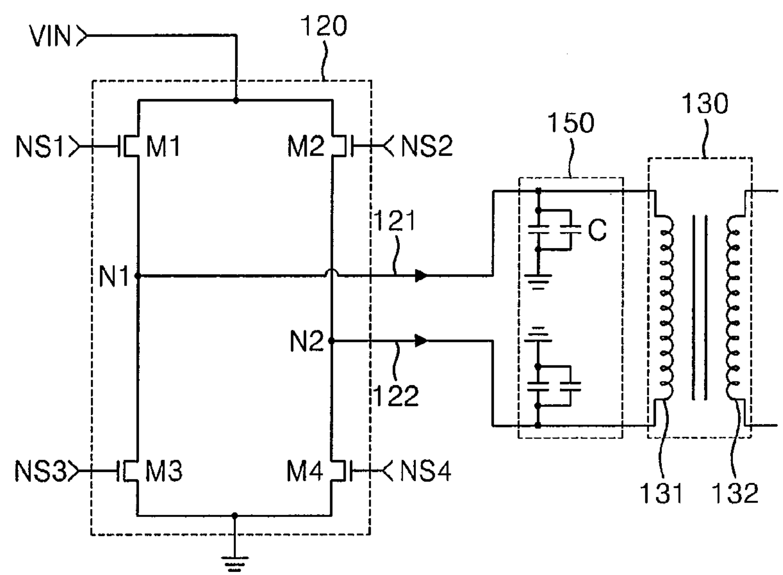
FIG. 3 is circuit diagram of a switching circuit, a bypass capacitor part, and a transformer of the inverter shown in FIG. 2.

FIG. 2 is a block diagram of the inverter shown in FIG. 1 according to a first exemplary embodiment of the present invention, and FIG. 3 is circuit diagram of a switching circuit, a bypass capacitor part, and a transformer of the inverter shown in FIG. 2.

Referring to FIG. 2 and FIG. 3, the inverter 100 includes a control signal generator 110, a switching circuit 120, a transformer 130, and a bypass capacitor part 150.

The control signal generator 110 generates a logic signal NS to control the amount of current generated from the switching circuit 120. To this end, the control signal generator 110 generates first to fourth logic signals NS1 to NS4 to control turn-on and turn-off time points of first to fourth transistors M1 to M4 of the switching circuit 120. The first to fourth logic signals NS1 to NS4 are supplied to the first to fourth transistors M1 to M4 of the switching circuit 120.

The switching circuit 120 drives the transistors M1 to M4 through the logic signal NS applied from the control signal generator 110 and generates an AC voltage VS and an AC current IS.

The switching circuit 120 includes switching elements, for example, metal-oxide-semiconductor field-effect transistors (MOSFETs) that are connected to each other in a half-bridge or full-bridge shape and converts a DC input voltage VIN into the AC voltage VS.

The switching circuit 120 may include the 4 field-effect transistors (FETs) M1 to M4 connected to each other in a full-bridge shape. All of the first to fourth transistors M1 to M4 may be N types or P types.

Alternatively, the first to fourth transistors M1 to M4 may be FETs of N types and P types. For example, the first and second transistors M1 and M2 may be P types and the third and fourth transistors may be N types.

The switching circuit 120 includes first and second output terminals 121 and 122 extended from first and second nodes N1 and N2, respectively. The first node N1 is formed between the first and third transistors M1 and M3. The second node N2 is formed between the second and fourth transistors M2 and M4.

The first to fourth transistors M1 to M4 are turned on or turned off according to the first to fourth logic signals NS1 to NS4 applied from the control signal generator 110.

The bypass capacitor part 150 is connected in parallel to the first and second output terminals 121 and 122 of the switching circuit 120. The bypass capacitor part 150 may include at least one capacitor C. A plurality of capacitors C may be used to increase the capacitance of the bypass capacitor part 150. When a plurality of capacitors C is used, they may be connected in parallel to each other.

The transformer 130 boosts the AC voltage VS and supplies a boosted lamp voltage VL to the lamp 61. The transformer 130 includes a primary coil 131 and a secondary coil 132.

The primary coil 131 is connected to the first and second output terminals 121 and 122 of the switching circuit 120. The secondary coil 132 is connected to the lamp 61. One side of the primary coil 131 is connected to the first output terminal 121 of the switching circuit 120 and the other side thereof is connected to the second output terminals 122 of the switching circuit 120. The AC current IS applied to the primary coil 131 periodically varies in direction according to the AC voltage supplied to the first output terminal 121 and the AC voltage VS supplied to the second output terminal 122. Accordingly, a lamp current IL is induced to the secondary coil 132.

The transformer 130 boosts an input voltage according to a winding ratio of the primary coil 131 and the secondary coil 132. For example, when the voltage applied to the primary coil 131 is about 20V to about 30V, a voltage of several hundred to several thousand volts is boosted at the output terminal of the secondary coil 132.

Figure 4:
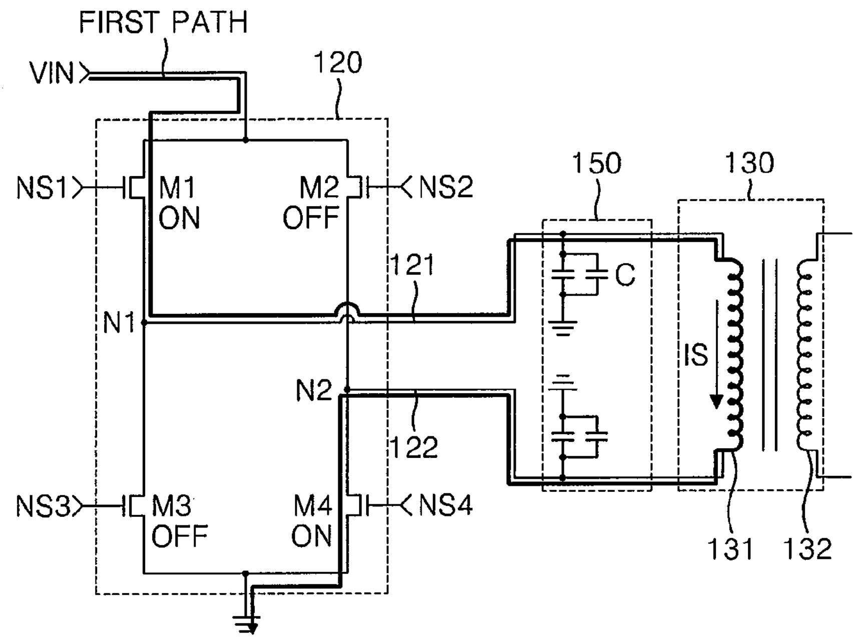
FIG. 4 and FIG. 5 show paths of current flowing into a primary coil of the transformer shown in FIG. 3.
Figure 5:
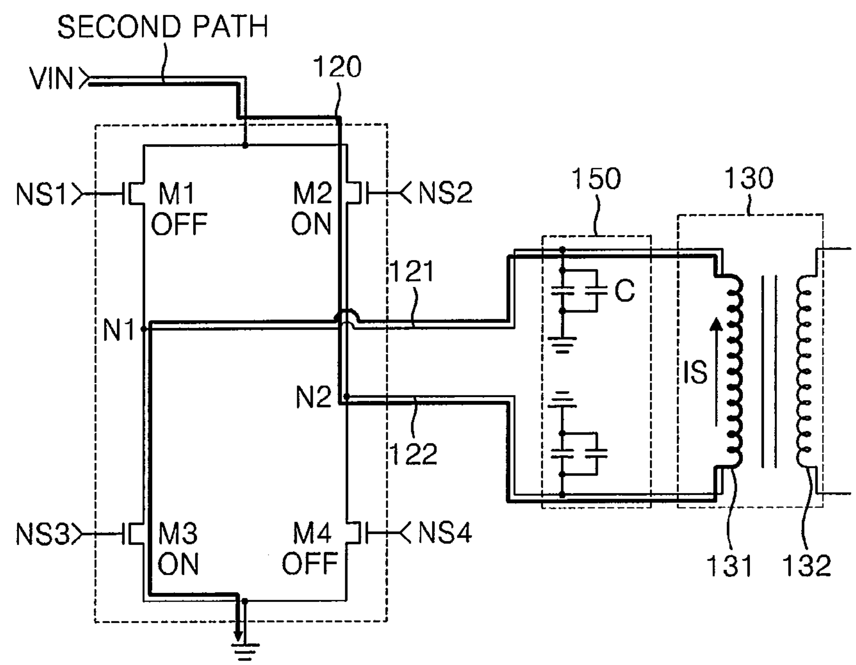

FIG. 4 and FIG. 5 show paths of current flowing into the primary coil of the transformer shown in FIG. 3.

Referring to FIG. 4 and FIG. 5, when the first and fourth transistors M1 and M4 are turned on and the second and third transistors M2 and M3 are turned off, in synchronization of the first to fourth logic signals NS1 to NS4, the AC current IS is applied to the primary coil 131 through a first path as shown in FIG. 4.

When the first and fourth transistors M1 and M4 are turned off and the second and third transistors M2 and M3 are turned on, the AC current IS is applied to the primary coil 131 through a second path as shown in FIG. 5. Since the first and second paths are opposite in direction, a path of current flowing into the primary coil 131 of the transformer 130 is periodically changed. Accordingly, the lamp voltage VL and the lamp current IL are induced to the secondary coil 132 of the transformer 130.

The bypass capacitor part 150 prevents ripple components of the AC voltage VS output at the first and second output terminals 121 and 122 of the switching circuit 120. That is, the bypass capacitor part 150 may prevent a ripple caused by the driving of the transistors M1 to M4 of the switching circuit 120.

Figure 6:
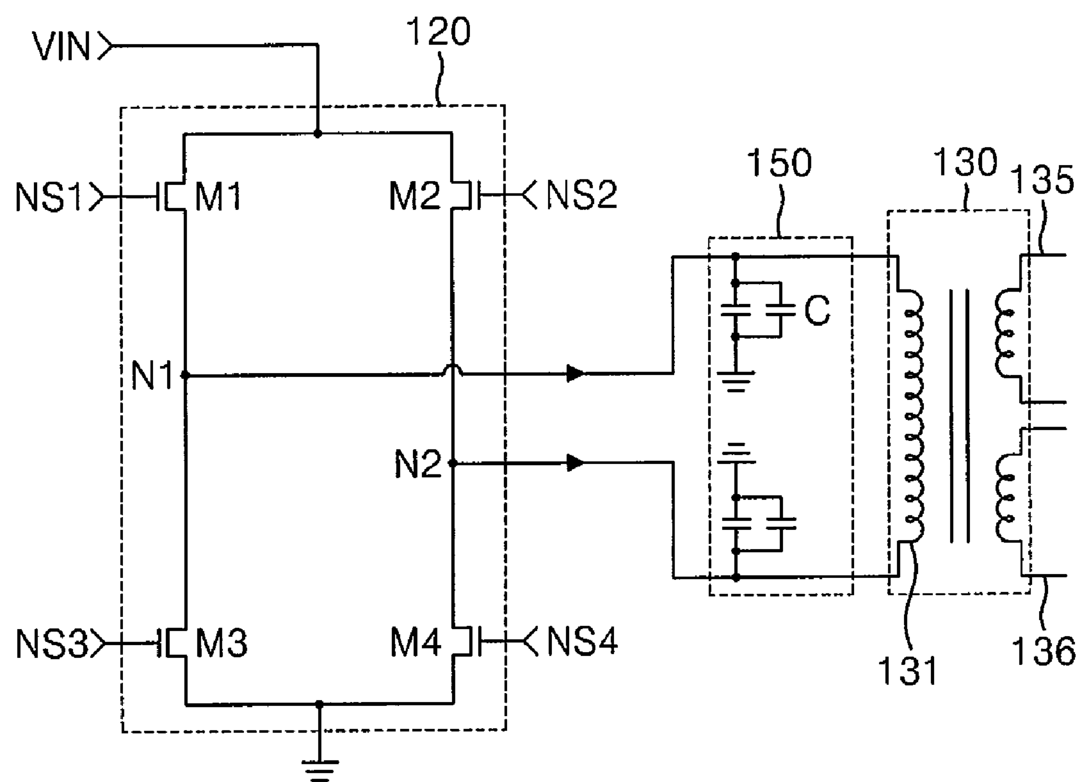
FIG. 6 is a circuit diagram of the inverter shown in FIG. 1 according to a second exemplary embodiment of the present invention.

FIG. 6 is a circuit diagram of the inverter shown in FIG. 1 according to a second exemplary embodiment of the present invention The inverter shown in FIG. 6 is the same as that shown in FIG. 3 except that the number of the secondary coils is plural. Therefore, a detailed description is not repeated.

Referring to FIG. 6, the inverter includes a switching circuit 120, a bypass capacitor part 150, and a transformer 130. The inverter may further include a control signal generator (not shown) for applying logic signals NS1 to NS4.

The transformer 130 includes two secondary coils 135 and 136. When the amount of current flowing into the primary coil 131 is ensured, two or more secondary coils may be formed. When the number of the secondary coils is two or more, a plurality of lamps may be connected to the output terminals of the secondary coil 132.

When the plurality of lamps 61 is connected to the secondary coils 135 and 136 of the transformer 130, current to be consumed in the respective lamps 61 is supplied from the primary coil 131. Namely, when the number of secondary coils is plural, a plurality of switching circuits 120 (each shown in FIG. 3) supplies the AC voltage VS and the AC current IS.

Figure 7A:
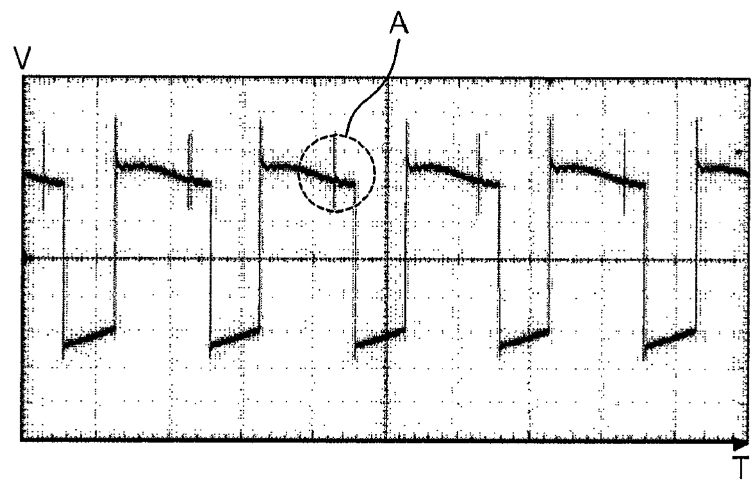
FIG. 7A and FIG. 7B are waveform charts showing ripple levels measured at a first output terminal of a switching circuit before and after a bypass capacitor part is formed, respectively.
Figure 7B:
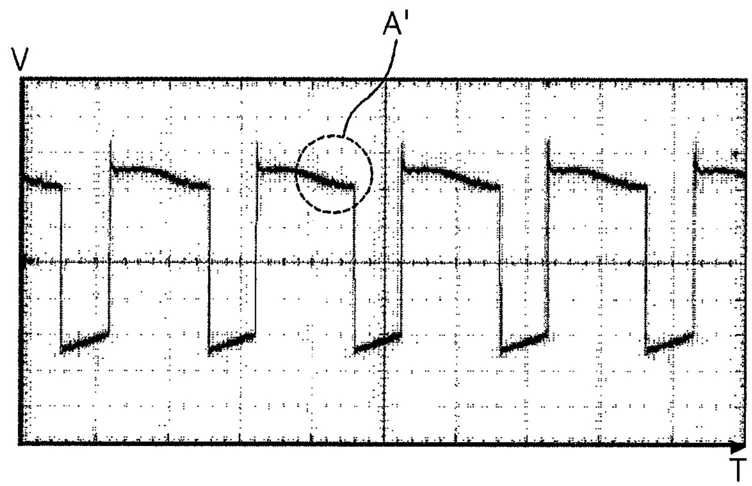

FIG. 7A and FIG. 7B are waveform charts showing ripple levels measured at the first output terminal of the switching circuit before and after the bypass capacitor part is formed, respectively.

Referring to FIG. 7A and FIG. 7B, voltage waveforms are shown that are measured at the first output terminal by an oscilloscope when the DC input voltage of 24V is applied. A ripple appears as shown by an area A in FIG. 7A but the ripple is removed as shown by an area A' in FIG. 7B. Consequently, it can be seen that when the bypass capacitor part is formed, the ripple is eliminated.

Figure 8:
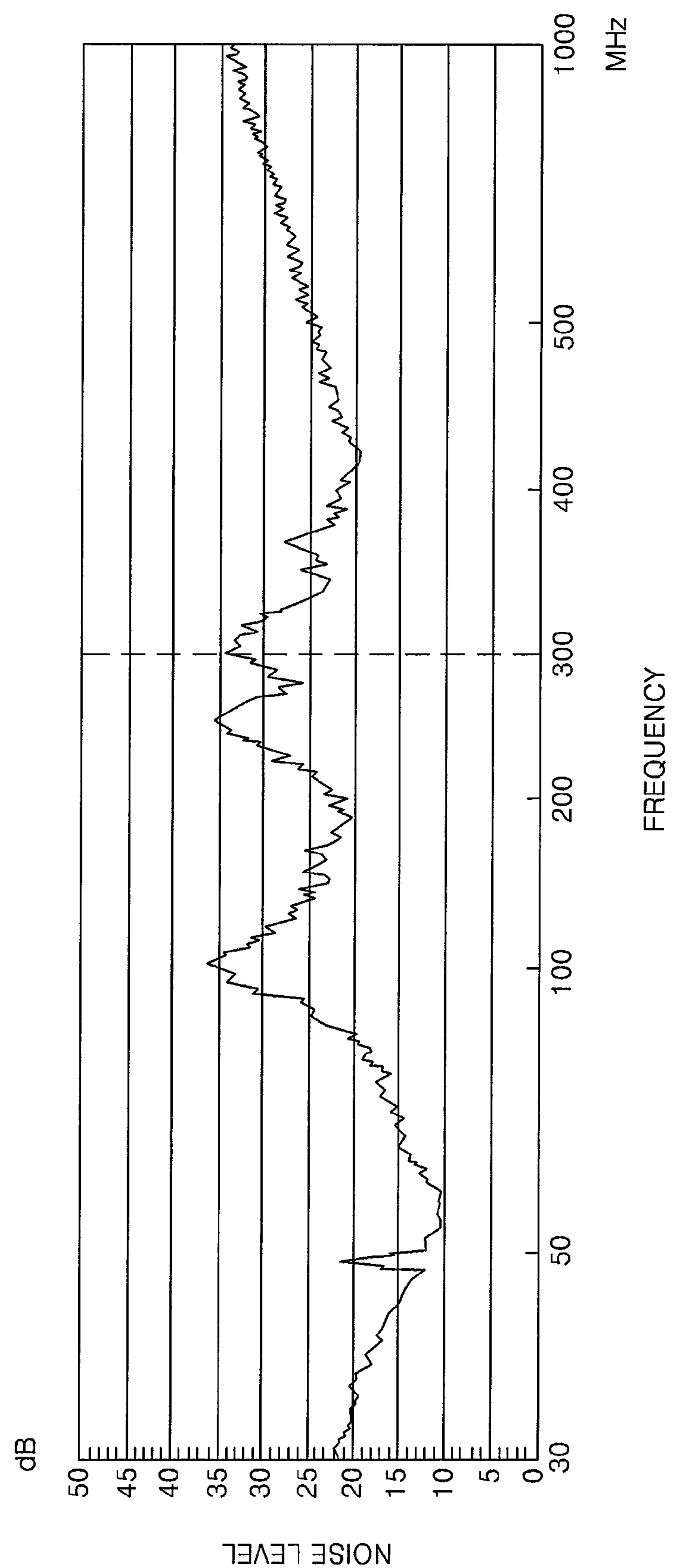
FIG. 8 and FIG. 9 are graphs for comparing ripple levels measured at an inverter before and after a bypass capacitor part is formed, respectively.
Figure 9:
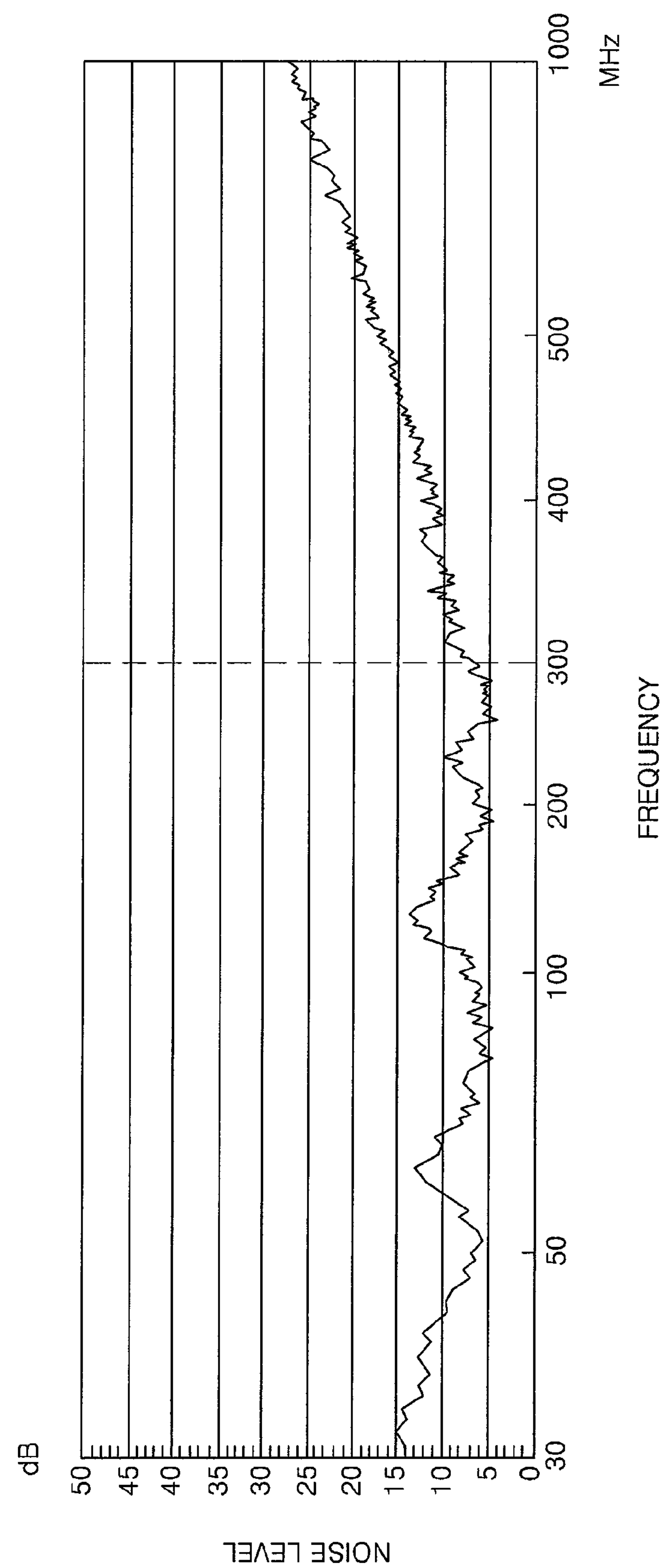

FIG. 8 and FIG. 9 are graphs for comparing ripple levels measured at an inverter before and after the bypass capacitor part is formed, respectively. FIG. 8 and FIG. 9 show noise levels measured by a spectrum analyzer at a frequency band of 30 to 1,000 MHz when the same voltage and the same logic signal are applied to the inverter.

FIG. 8 shows a noise level measured at a frequency band of 30 to 1,000 MHz before the bypass capacitor part is formed. The noise level generated at a frequency band of 30 to 300 MHz ranges from about 10 dB to about 35 dB. The LCD panel or other electronic devices may be negatively affected by such a broadband noise. Accordingly, the broadband noise should be limited to a level, for example, 20 dB or less.

FIG. 9 shows a noise level measured at a frequency band of 30 to 1,000 MHz after the bypass capacitor part is formed. The noise level generated at a frequency band of 30 to 300 MHz ranges from about 5 dB to about 15 dB. It is apparent that the noise level is reduced. In addition, the bypass capacitor part can prevent a ripple at a voltage line input to the switching circuit.

Figure 10A:
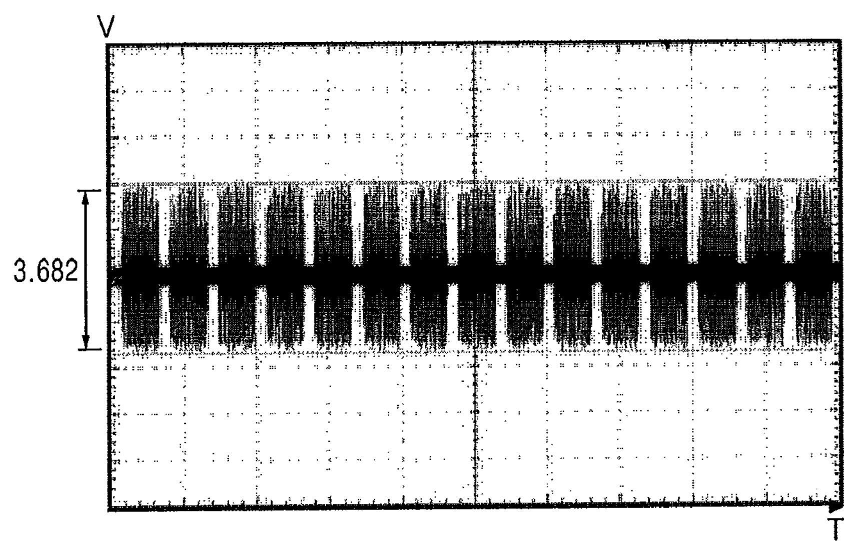
FIG. 10A and FIG. 10B are waveform charts showing ripple levels measured at a ground before and after a bypass capacitor part is formed, respectively.
Figure 10B:
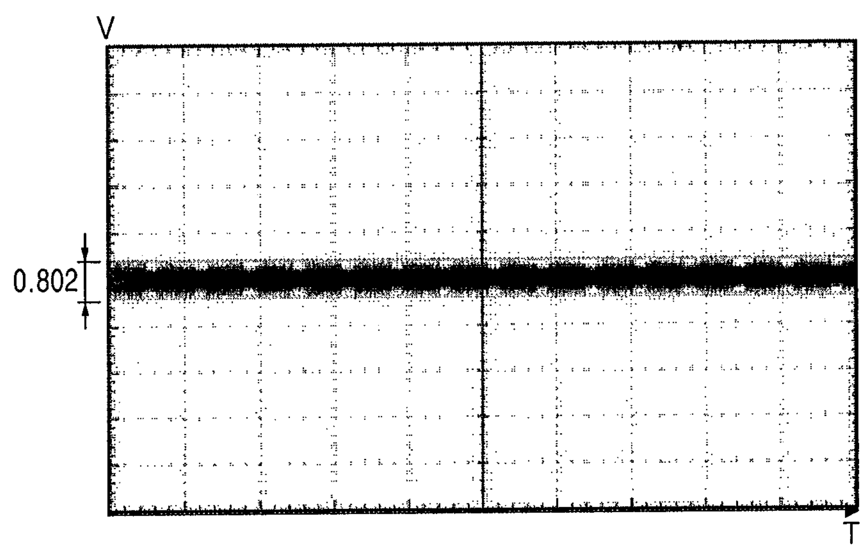

FIG. 10A and FIG. 10B are waveform charts showing ripple levels measured at a ground by an oscilloscope before and after the bypass capacitor part is formed, respectively. In FIG. 10A and FIG. 10B, a vertical axis shows a voltage and a horizontal axis shows time.

Referring to FIG. 1A, a voltage level measured at a ground before the bypass capacitor part is formed is ±1.841V based on the ground. That is, a level width of 3.682V is periodically generated. Referring to FIG. 10B, a voltage level measured at the ground after the bypass capacitor part is formed is ±0.401V based on the ground. Namely, a level width of 0.802V is periodically generated. Accordingly, it can be seen that when the bypass capacitor part is formed, the ground voltage is stabilized. Furthermore, the bypass capacitor part can prevent a ripple generated at a power line that supplies an input voltage to the switching circuit.

Figure 11A:
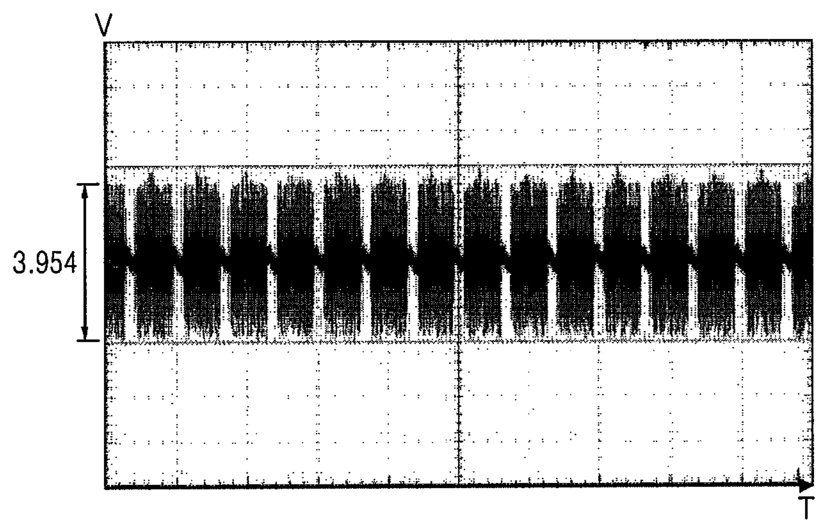
FIG. 11A and FIG. 11B are waveform charts showing ripple levels measured at a power line before and after a bypass capacitor part is formed, respectively.
Figure 11B:
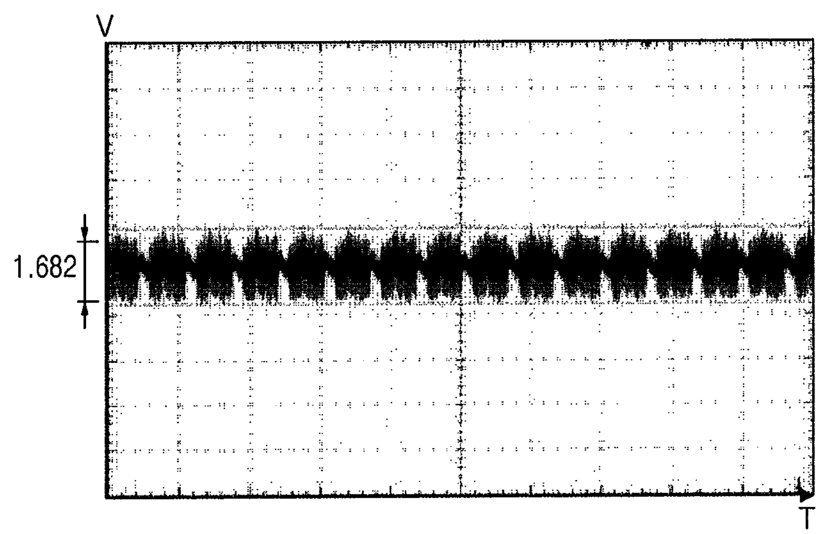

FIG. 11A and FIG. 11B are waveform charts showing ripple levels measured at a power line by an oscilloscope before and after the bypass capacitor part is formed, respectively.

Referring to FIG. 11A, a level width of a ripple generated at an input voltage measured at the power line before the bypass capacitor part is 3.954V and is periodically generated. Referring to FIG. 11B, a level width of a ripple generated at an input voltage measured at the power line after the bypass capacitor part is 1.682V and is periodically generated. Accordingly, when the bypass capacitor part is formed, an input voltage is stabilized.

Figure 12:
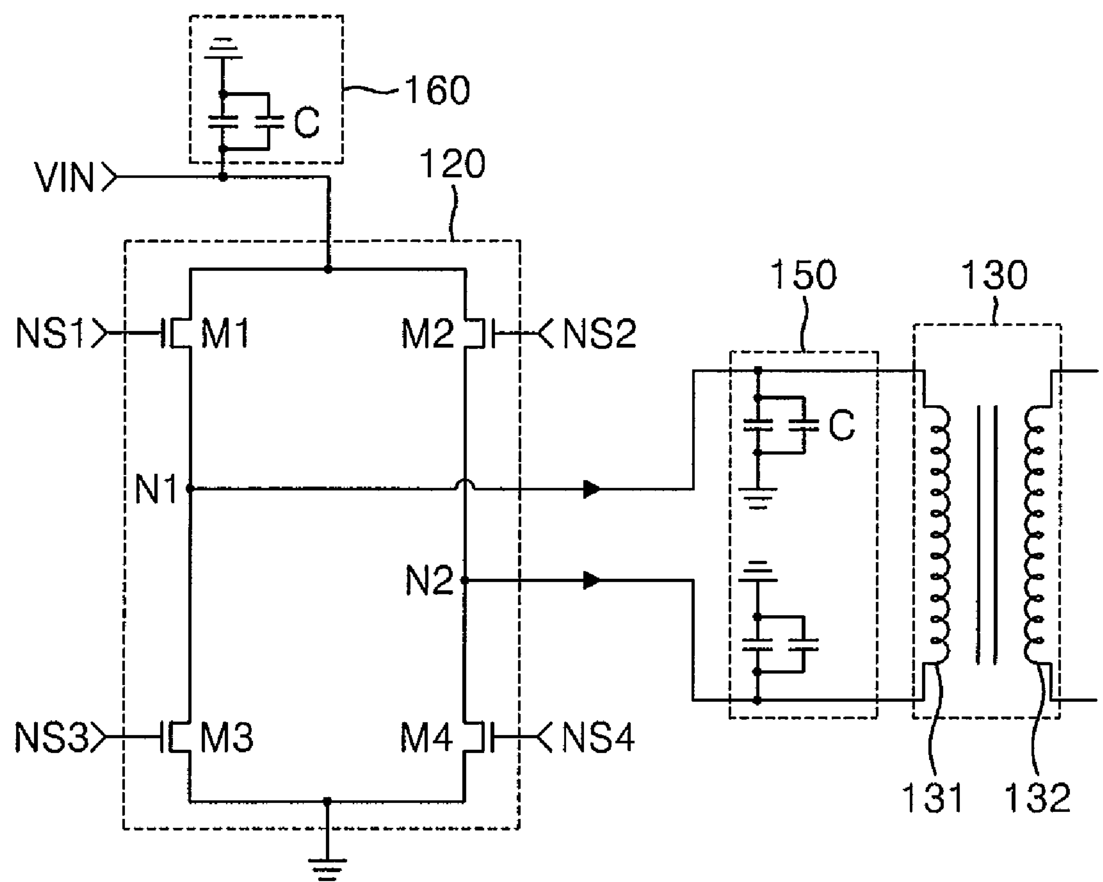
FIG. 12 is a circuit diagram of the inverter shown in FIG. 1 according to a third exemplary embodiment of the present invention.

FIG. 12 is a circuit diagram of the inverter shown in FIG. 1 according to a third exemplary embodiment of the present invention.

Referring to FIG. 12, a second bypass capacitor part 160 is connected to an input voltage VIN. The second bypass capacitor part 160 prevents a ripple of the input voltage VIN supplied from a power supply. The second bypass capacitor part 160 may include at least one capacitor C. Although the second bypass capacitor part 160 includes two capacitors C connected in parallel to each other, three or more capacitors may be connected in parallel to each other.

As described above, since the bypass capacitor part is provided at the output terminal of the switching circuit of the inverter, a ripple of a voltage applied to the primary coil of the transformer is removed and thus an AC voltage is stabilized.

Moreover, since the broadband noise is reduced, there is no need to use a shield case for shielding the inverter and thus costs and weight of the inverter are decreased.

Furthermore, noise caused by a ripple of the input terminal of the switching circuit of the inverter and a ripple of the ground is reduced.

As will by now be evident to persons of skill in this art, many modifications, substitutions and variations can be made in and to the materials, components, configurations and methods of implementation of the LCD panels and methods for manufacturing them of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. An inverter, comprising:

a switching circuit for converting an input voltage into an alternating current ("AC") voltage;

a transformer for boosting the AC voltage generated from the switching circuit; and a bypass capacitor part connected between an output terminal of the switching circuit and the transformer, wherein the bypass capacitor part comprises a plurality of capacitors connected in parallel to each other.

2. The inverter of claim 1, further comprising:

a power supply for supplying the input voltage to the switching circuit; and a control signal generator for supplying a logic signal to the switching circuit.

3. The inverter of claim 2, further comprising a second bypass capacitor part connected in parallel between the power supply and the switching circuit.

4. The inverter of claim 2, wherein the transformer comprises:

a primary coil to which the AC voltage generated from the switching circuit is applied; and a secondary coil connected to at least one lamp.

5. The inverter of claim 4, wherein the secondary coil is plural in number.

6. A liquid crystal display device, comprising:

a liquid crystal display panel;

a lamp for supplying light to the liquid crystal display panel; and an inverter for driving the lamp;

a gate driver and a data driver for driving the liquid crystal display panel;

a timing controller for supplying a control signal and a data signal to the gate driver and the data driver;

a power supply for supplying a driving voltage to the gate driver and the data driver and supplying an input voltage to the inverter; and a control signal generator for supplying a logic signal to the inverter;

wherein the inverter comprises a switching circuit for converting an input voltage into an alternating current ("AC") voltage, a transformer for boosting the AC voltage generated from the switching circuit, and a bypass capacitor part connected in parallel between an output terminal of the switching circuit and the transformer.

7. The liquid crystal display device of claim 6, further comprising a second bypass capacitor part connected in parallel between the power supply and the switching circuit.

8. The liquid crystal display device of claim 6, wherein the bypass capacitor circuit comprises a plurality of capacitors connected in parallel to each other.

9. The liquid crystal display device of claim 6, wherein the transformer comprises:

a primary coil to which the AC voltage generated from the switching circuit is applied; and a secondary coil connected to the lamp.

10. The liquid crystal display device of claim 9, wherein the secondary coil is plural in number.

* * * * *